United States Patent [19]

Coakwell

[11] 4,182,278
[45] Jan. 8, 1980

[54] COMBUSTION SYSTEM FOR INTERNAL COMBUSTION ENGINES

[76] Inventor: Charles A. Coakwell, 6600 N. IH 35 No. 33 Casa Norte, Loredo, Tex. 78041

[21] Appl. No.: 828,307

[22] Filed: Aug. 29, 1977

[51] Int. Cl.² .............................................. F02B 51/00
[52] U.S. Cl. ........................... 123/1 A; 123/DIG. 12; 123/3; 123/25 E; 123/198 A
[58] Field of Search ................. 123/1 A, 3, DIG. 12, 123/25 C, 25 E, 198 A

[56] References Cited

U.S. PATENT DOCUMENTS

| | | | |
|---|---|---|---|
| 3,608,529 | 9/1971 | Smith | 123/1 |
| 3,792,690 | 2/1974 | Cooper | 123/3 |
| 3,908,613 | 9/1975 | Loby | 123/1 |
| 3,963,000 | 6/1976 | Kosaka | 123/1 A |
| 3,977,365 | 8/1976 | Vierling | 123/3 |
| 3,977,366 | 8/1976 | Yamaguchi et al. | 123/3 |
| 4,004,413 | 1/1977 | Ueno | 123/1 |
| 4,004,554 | 1/1977 | Kosaka et al. | 123/3 |
| 4,036,180 | 7/1977 | Noguchi et al. | 123/3 |

Primary Examiner—Ira S. Lazarus
Attorney, Agent, or Firm—Vincent A. Greene

[57] ABSTRACT

A unique process is disclosed for modifying an automobile engine to improve fuel economy and reduce harmful exhaust emissions by introducing water and an oxidizing agent, such as hydrogen peroxide, when the engine is under load. The carburetor of a standard engine is adjusted to provide a very lean air-fuel mixture and to increase the air-fuel ratio substantially (e.g., 10 to 20 percent). The amount of hydrogen peroxide injected into the engine depends on the rate of fuel flow and may be regulated by the throttle valve or intake manifold pressure. Means are provided for maintaining a supply of hydrogen peroxide including a high pressure mixing tank containing water and hydrogen peroxide and a pair of removable oxygen tanks for a continuous supply of oxygen to the tank.

12 Claims, 3 Drawing Figures

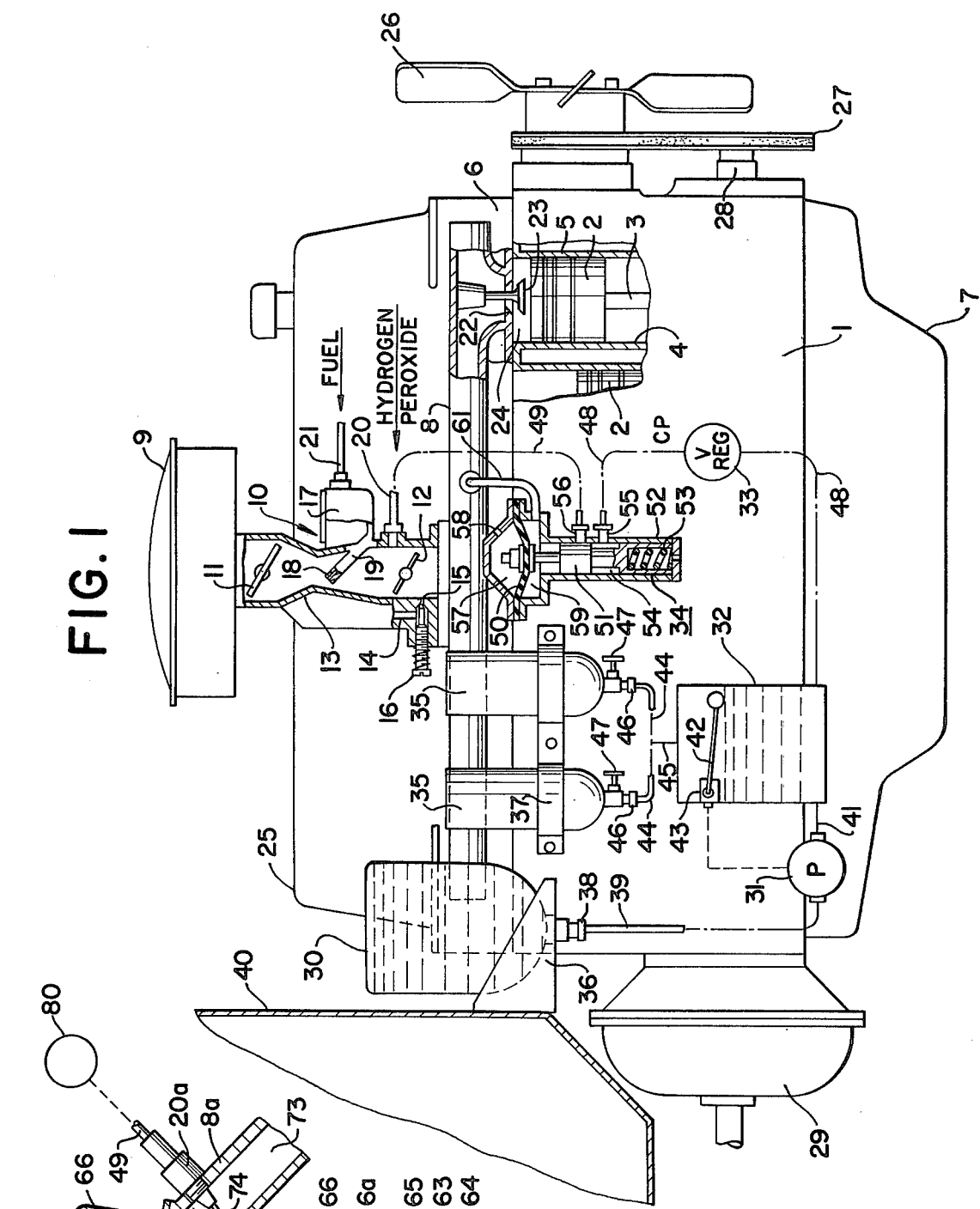

COMBUSTION SYSTEM FOR INTERNAL COMBUSTION ENGINES

BACKGROUND OF THE INVENTION

During the last decade vast sums have been spent in an attempt to improve the gas mileage in modern high-compression automobile engines. Attempts have been made to operate the engines with lean fuel-air mixtures and lead-free gasoline, but it has been difficult to obtain satisfactory performance in this way because of ignition or combustion problems when the air-fuel ratio is high, particularly when it exceeds 17 to 1. It is also difficult to avoid knocking and to achieve good all around performance in lean-burn engines using lead-free or low octane gasoline and compression ratios such as 9:1 to 10:1 or higher.

Ignition problems are less severe in a lean-burn engine when torch ignition is employed as in Honda-type engines which have the spark plug located in an auxiliary combustion chamber. However, the combustion problem is still a limiting factor and the engines cannot operate satisfactorily with an air-fuel ratio of 20 to 1. The large amounts of nitrogen apparently interfere with proper combustion.

SUMMARY OF THE INVENTION

The present invention solves the above problems by injecting a nitrogen-free oxidizing fluid, such as hydrogen peroxide, into the engine. This combined with water injection makes it possible to operate a modern high-compression engine at a high air-fuel ratio, such as 18:1 to 20:1, when using lead-free or low octane fuel.

The invention applies to all types of internal combustion engines and can be employed to modify existing engines. For example, an existing automobile can be modified by adjusting or changing the main discharge jet to provide a leaner fuel-air mixture and by providing means for injecting water and hydrogen peroxide into the carburetor in accordance with engine load. The flow of the hydrogen peroxide may be easily regulated by a valve responsive to movement of the gas pedal or throttle valve or responsive to intake manifold pressure.

A continuous supply of hydrogen peroxide can be maintained by providing a high pressure mixing tank containing water and hydrogen peroxide and by supplying pure oxygen to the top of the tank from one or more oxygen tanks.

Optionally, oxygen from the tanks may be introduced into the combustion chamber of each cylinder to promote ignition during starting or operation of the engine.

The invention is also applicable to lean-burn Honda-type engines having an auxiliary carburetor and having an auxiliary combustion chamber for each cylinder. The torch ignition principle plus hydrogen peroxide injection into the main carburetor or into the main combustion chamber makes it possible to operate with extremely high air-fuel ratios.

The process of this invention improves the efficiency of the engine and minimizes air pollution. It permits use of lead-free gasoline, gasolines of various octane ratings, and various gasoline mixtures. The gasoline may be mixed with substantial amounts of alcohol or with small amounts of various other fuels such as a nitroparaffin, a naphthene or an olefin; but conventional gasolines are usually preferred.

BRIEF DESCRIPTION OF THE DRAWINGS

In the drawings:

FIG. 1 is a schematic view showing the apparatus of the present invention mounted on a conventional automobile engine;

FIG. 2 is a fragmentary vertical sectional view showing a portion of an engine modified to employ the apparatus of this invention.

DESCRIPTION OF PREFERRED EMBODIMENTS

Figure 3:
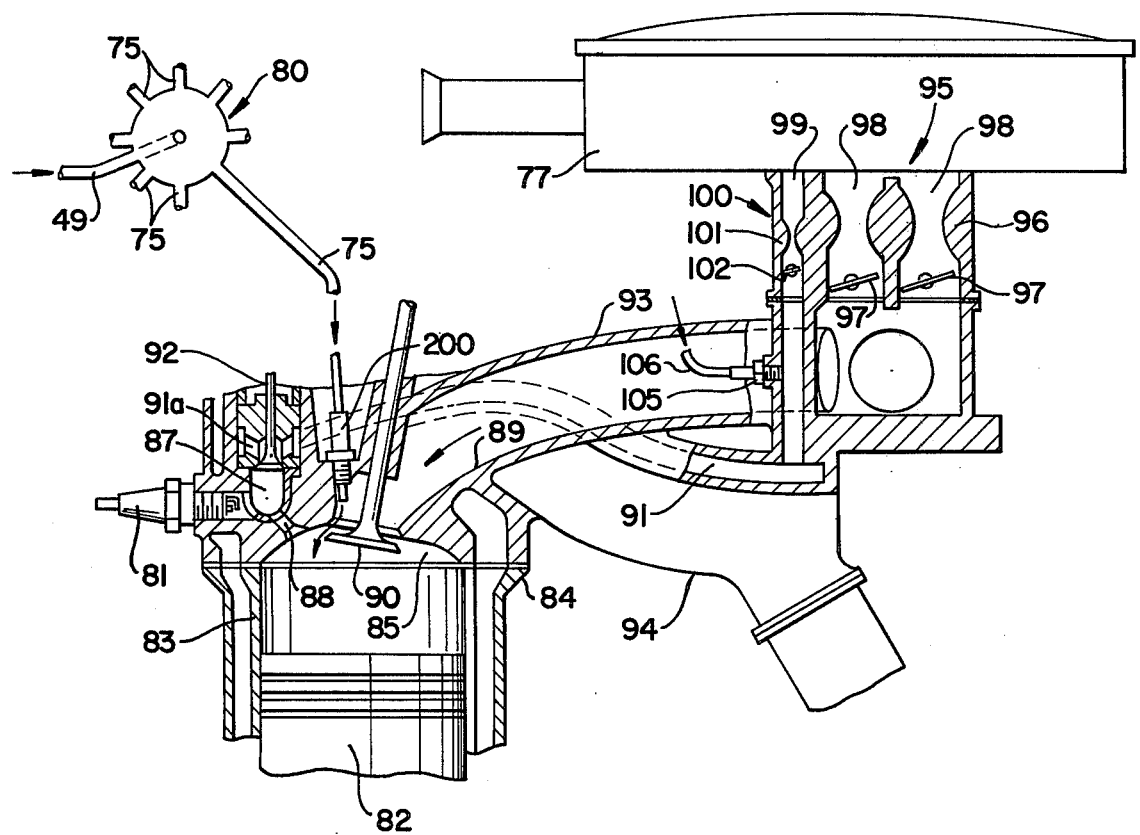
FIG. 3 is a fragmentary vertical sectional view showing another embodiment of the invention as applied to a Honda-type engine with an auxiliary combustion chamber for torch ignition.

The process of the present invention may be applied to any conventional high-compression automobile engine and particularly the common reciprocating-piston internal combustion engine. FIG. 1 illustrates one embodiment of the invention wherein the invention is applied to a conventional in-line, four-stroke, six cylinder, overhead-valve automobile engine A having a cast iron cylinder block 1 with pistons 2 arranged to drive the crankshaft (not shown) through connecting rods 3. The pistons reciprocate in the vertical cylindrical bores 4 of the cylinder walls 5 which are cooled by water or other liquid coolant from the radiator (not shown). A conventional cylinder head 6 is mounted on the top of the engine block 1, and an oil pan 7 is mounted on the bottom of the block. An intake manifold 8 and an exhaust manifold (not shown) are mounted on the cylinder head. The air passes through an air cleaner 9 to a carburetor 10, where it is mixed with fuel, and the air-fuel mixture passes to the intake manifold. The carburetor receives gasoline from the fuel pump (not shown) through a fuel line 21. The flow of air is controlled by a choke valve 11 and a throttle valve 12 and the fuel flow is regulated by the carburetor in the conventional manner by means of a Venturi 13 and associated fuel metering means.

The carburetor 10 may be of conventional construction (except for the auxiliary discharge nozzle 20) and may, for example, be a standard Carter carburetor of the type commonly used in passenger cars during the last 2 decades. As shown, the carburetor has the usual idle air passage 14 and idle discharge passage 15 and an idle adjusting screw 16 which may be turned to enlarge or restrict the opening at the discharge passage. The latter passage is located at or slightly below the throttle valve when the valve is closed, and the air-fuel mixture passing through passage 14 is preferably somewhat rich to facilitate idling at low speeds and starting the engine.

The carburetor 10 has the usual float chamber housing 17 providing a reservoir of fuel and containing a float to maintain the fuel at the proper level. A main discharge jet 18 is located within the Venturi 13 at the upper end of an inclined discharge tube 19 which extends from the bottom of the float chamber. The tube may contain a metering orifice to regulate the flow of fuel, and the fuel flow is such as to provide a lean air-fuel mixture for normal engine operation.

In accordance with the present invention the carburetor is constructed and/or adjusted to provide a higher air-fuel ratio than would be provided by the main discharge jet 18 according to conventional practice and a special discharge nozzle 20 is provided for injecting an oxidizing agent, such as hydrogen peroxide. The invention is illustrated as applied to a conventional downdraft carburetor, but it will be understood that other types of carburetors can be used.

The invention may be applied to various types of engines including rotary engines and compression ignition engines, but is shown applied to a simple spark-ignition engine having cam-operated intake and exhaust valves for each cylinder. As shown the intake valve 23 is arranged to move into and out of contact with the valve seat 22 to admit the air-fuel mixture from the intake manifold 8 to the combustion chamber 24 of each cylinder. The valve actuating means is located under the valve cover 25 and may, for example, be of the general type illustrated in FIG. 2.

The engine shown herein is a standard type of water-cooled automobile engine with a fan 26 driven from the crankshaft by a fan belt 27 and water-pump pulleys 28. The engine has a transmission 29 and is mounted in an automobile having a firewall 40.

In accordance with the invention, auxiliary means are provided for supplying hydrogen peroxide to the engine which may include a liquid supply tank 30, a motor-driven injection pump 31, a mixing tank 32, valves 33 and 34, and a pair of oxygen tanks 35.

The tanks 30 and 35 are removable and are shown as being supported in inverted positions by suitable brackets 36 and 37, respectively. The tank 30 has a fitting 38 detachably connected to a supply conduit 39 which extends to the inlet of pump 31. The pump discharges to the tank 32 through discharge conduit 41 and maintains a high pressure on the liquid in the tank.

The motor of the pump may be controlled in accordance with the liquid level and/or the pressure in the tank 32 to maintain the necessary liquid pressure. As herein shown, a float 42 and a float-operated control unit 43 are provided for controlling operation of the pump 31 to maintain a constant liquid level in the mixing tank 32. Where the pump is driven by an electric motor, the unit 43 may start and stop the motor in accordance with the position of the float.

As shown, a pair of oxygen tanks 35 are provided for supplying oxygen to the upper part of the tank 32 through the conduits 44 and 45. Each tank has a fitting 46 detachably connected to the associated conduit 44 and a valve 47 for controlling flow of oxygen from the tank. The second oxygen tank is optional but is preferred.

The pressure in the tanks 35 may be 20 to 50 atmospheres or higher, and the mixing tank 32 is designed to withstand such pressures. The pressure on the liquid must be reduced before it is injected into the carburetor 10, and a pressure reducing means is provided for this purpose. For example, a constant pressure valve 33 may be provided in the conduit 48 leading from the tank 32 to maintain the pressure at the outlet side of the valve 33 at a predetermined value, such as 5 to 10 pounds per square inch. The valve 33 is responsive to the outlet pressure and closes when that pressure exceeds said predetermined value.

The control valve 34 is provided between the conduit 48 and the conduit 49 to regulate the flow of liquid to the discharge nozzle 20 at the end of conduit 49. The valve 34 may be opened and closed in response to movement of the throttle valve 12 or in response to the pressure in the intake manifold 8 so that hydrogen peroxide and water are injected into the carburetor when the throttle 12 is opened and the engine is under high load. As herein shown, the valve 34 is a spool-type valve operated by a diaphragm 50 responsive to intake manifold pressure. The valve has a spool valve member 51 connected to the diaphragm and mounted to reciprocate in a cylinder 52. The bottom portion of the valve member has a recess to receive a spring 53 and the middle portion has an annular peripheral groove 54 with an axial length sufficient to establish communication between the inlet opening 55 and the outlet opening 56 when the valve is in the open position.

The diaphragm 50 is mounted in a housing having an upper chamber 57 with a vent opening 58 and a lower chamber 59 with a conduit 61 connected to the intake manifold 8. At low loads with the throttle 12 near the closed position, the subatmospheric pressure in the intake manifold and in the chamber 57 causes the diaphragm 50 to move downwardly and compress the spring 53, thereby closing the outlet 56 as indicated in FIG. 1. Under high load with the throttle 12 opened wide, the pressure in the intake manifold increases and the difference in pressure between chambers 57 and 59 decreases so that the spring 53 can move the valve to the open position and admit liquid from conduit 48 to conduit 49. Thus liquid is injected through the nozzle 20 whenever the engine is operated under a high load, for example when the automobile is accelerating or going up a hill.

The process of operating the engine of FIG. 1 is described in more detail hereinafter, it being understood that such process can be applied to engines quite different from those illustrated herein.

FIG. 2 is a fragmentary view showing another embodiment of the invention wherein the hydrogen peroxide or other oxidizing agent is injected at the cylinder head rather than into the carburetor. The four-stroke internal combustion engine of FIG. 2 may be of essentially the same type as the engine of FIG. 1 and each cylinder may have generally the same basic elements shown in FIG. 2 plus a conventional exhaust valve (not shown), in the cylinder head 6a. The piston 2 of each cylinder reciprocates in the bore 4 of the cylinder wall 5a within the cooling jacket 72 to drive the crankshaft which in turn drives the cam 63 and camshaft 64 through timing chains (not shown). The cam effects operation of the intake and exhaust valves in the usual manner.

As shown the valve operating means is of a conventional type including tappets 65, push rods 66 and rocker arms 67 located under the valve cover 25a. The end portion of each rocker arm engages the flat end member 68 carried by the valve stem 69 and moves the intake valve 23a out of contact with its seat 22a by compressing the valve spring 71. Opening of the intake valve admits the air-fuel mixture form the passage 73 of the intake manifold 8a to the combustion chamber 24a where it may be ignited by a spark plug 60 at or after the end of the compression stroke. A wedge-shaped combustion chamber is shown in FIG. 2 but various other shapes can be employed.

In accordance with the invention, the hydrogen peroxide from conduit 79 is injected from a suitable distributor through injector member 20a into the air-fuel mixture entering the combustion chamber in timed relation with the crankshaft as described in more detail hereinafter. Said injector member may be located to inject directly into its associated cylinder or to inject into the cylinder head and may be located in the cylinder head. As shown it is spaced from the intake valve 23a and has a curved discharge tube 74 which directs the liquid toward the valve stem 69.

As shown in FIG. 2, the electrodes of the spark plug 60 are located at the bottom face of the head 6a and at a point farthest from the piston 2 so that ignition starts at the uppermost portion of the combustion chamber. Optionally, oxygen or an oxygen-rich gas can be injected adjacent the spark plug electrodes during the last part of the compression stroke to facilitate ignition of a lean mixture. The optional injection nozzle 120 may be positioned adjacent the spark plug 60 of each cylinder to admit metered amounts of pure oxygen to the combustion chamber 24a from a supply conduit 121 connected to a source of oxygen, such as the oxygen tanks 35. The process is described in more detail hereinafter.

The present invention involves a process for operating engines of various types and is particularly well suited for four-stroke internal combustion engines of the type used in "Honda" automobiles having an auxiliary combustion chamber for effecting "torch ignition". An engine of this type is shown and described in U.S. Pat. No. 3,832,984 and is illustrated in FIG. 3 hereof. Similar engines with auxiliary combustion chambers having a common assignee (Honda) are disclosed in U.S. Pat. Nos. 3,830,205; 3,830,206; 3,853,097; 3,837,322; 3,852,379; and 3,844,259; and it will be understood that the various cam mechanisms, carburetors, and fuel feeding mechanisms disclosed in these patents or used in modern Honda automobiles may be incorporated in an engine which is used to practice the present invention as will be apparent from the description of this invention.

FIG. 3, which is employed for purposes of example, shows a Honda-type four-stroke internal combustion engine having a series of pistons 82 mounted in the cylinders 83 of a water-cooled engine block 84. The basic engine may have 4 to 8 cylinders, for example, and may be of conventional construction. Each cylinder of the cylinder head 86 has a main combustion chamber 85 and has a small auxiliary combustion chamber 87 which opens to the spark plug 81. A torch nozzle or passage 88 extends between the chamber 85 and the chamber 87 to permit the flame to ignite the lean mixture in the main combustion chamber.

Respiration of the Honda-type engine is provided by three valved ports. A lean air-fuel mixture is periodically provided to the main combustion chamber 85 through a main intake passage 89 of the intake manifold 93. The flow through passage 89 is controlled by the main intake valve 90. A rich air-fuel mixture is periodically provided to the auxiliary combustion chamber 87 through an auxiliary intake passage 91. A small auxiliary intake valve 92 controls flow to the chamber 87. A conventional exhaust valve (not shown) controls the exhausting of the burned gases from the cylinder 83 to the exhaust manifold 94. If desired, heat from the exhaust manifold may be employed to preheat the air-fuel mixture from the carburetor as disclosed in said U.S. Pat. No. 3,832,984.

The flame generated in the auxiliary chamber 87 effects ignition of the lean mixture in the main combustion chamber 85 and makes possible substantial savings in fuel and less air polution.

In the engine of FIG. 3 a special carburetion system is required to supply the lean and rich fuel-air mixtures required for the chambers 85 and 87, respectively. As shown most of the air from the air cleaner 77 passes through a main dual carburetor 95 having two Venturis 96 and two throttle valves 97 controlling flow through the intake passages 98 to the intake manifold 93. The carburetor 95 can be adjusted to provide a lean fuel-air mixture (for example, an air/fuel ratio in excess of 17:1).

A minor portion of the intake air passes through a second carburetor 100 with an intake passage 99 which is small relative to the passage 98. The auxiliary carburetor has a small Venturi 101 and a small throttle valve 102 for controlling flow to the intake passage 91 of the auxiliary intake manifold, and the carburetor 100 is adjusted to provide a richer fuel-air mixture (for example, an air-fuel ratio less than 16:1).

The throttle valves 97 and 102 are operated simultaneously and may have dual controls or synchronized controls as disclosed, for example, in U.S. Pat. No. 3,830,206 or as commonly used in automotive vehicle engines. Likewise the intake valves 90 and 92 of each cylinder may be operated in the desired sequence using conventional valve-operating mechanisms, such as disclosed in U.S. Pat. Nos. 3,830,205 and 3,853,097.

The engine of FIG. 3 may be a standard type of Honda engine, such as a four-stroke four cylinder automobile engine designed to operate with standard gasoline; however, the engine is modified in accordance with this invention by adding auxiliary means for injecting an oxidizing agent and for increasing the amount of oxygen available for combustion and by adjusting the carburetor to provide a leaner fuel-air mixture.

The engine may, for example, be modified by injecting an oxidizing agent, such as hydrogen peroxide, into the main combustion chamber 85 or into the main carburetor 95. The injection means may, for example, be similar to the General Motors fuel injection system illustrated on page 407 of "Internal Combustion Engines" (Third Edition) by Edward F. Obert, published 1968 by International Textbook Company. In that system a distributor or fuel divider (corresponding to the distributor 80 herein) supplies fuel periodically to a series of nozzles, each located in an inlet port and aimed at an inlet valve.

As herein shown, a nozzle 200 is located near and above each intake valve 90 and directs the hydrogen peroxide solution toward the head of the valve 90 and toward the intake port opening. The hydrogen peroxide and water are supplied from a suitable source such as a hydrogen peroxide tank or an apparatus as shown in FIG. 1 and the distributor or liquid divider 80 may be connected to the discharge end of the conduit 48 or 49 of FIG. 1.

The distributor 80 may be essentially the same as that employed in the General Motors fuel-injection system described above and has a conduit 75 extending to the nozzle 200 of each cylinder. Eight are provided for a V-8 engine and four are provided for a four-cylinder Honda engine. The distributor is driven by the engine in timed relation thereto and causes metered amounts of the liquid to be injected into each cylinder at a predetermined time during the intake stroke while the intake port is open as shown in FIG. 3, for example during the half of the intake stroke and before the valve 90 closes.

The pressure on the hydrogen peroxide solution supplied to the distributor is high enough to provide the desired flow rate through the nozzle 200 and may be regulated by a suitable valve, such as the valve 33 of FIG. 1. The flow may also be regulated by manifold pressure to reduce flow under low load conditions using a diaphragm operated valve, such as the valve 34.

Optionally pure oxygen or a gas rich in oxygen can be injected into the auxiliary carburetor 100 or the auxiliary intake passage 91 to facilitate ignition in the auxiliary combustion chamber 87. As shown, an optional nozzle 105 is provided below the carburetor 100 to receive oxygen from conduit 106 which can be connected to a suitable oxygen source, such as the oxygen tanks 35. The oxygen injection makes it possible to obtain satisfactory ignition in the chamber 87 with the carburetor 100 adjusted to provide a somewhat leaner mixture, and is a possible way to facilitate starting or to effect fuel savings. It may also have advantages when using special fuel mixtures such as mixtures of alcohol and gasoline.

It will be understood that the distributor 80 is not needed if the hydrogen peroxide solution is introduced into the main carburetor as in the embodiment of FIG. 1.

In carrying out the process of this invention in a standard automobile engine, such as illustrated in FIG. 1, it is preferable to adjust the carburetor so that the main discharge jet 18 provides a lean mixture and so that the idling discharge at 15 provides either a rich mixture or a mixture rich enough to permit satisfactory idling of the engine, for example at speeds of 400 to 800 revolutions per minute. For example, the air-fuel ratio during idling may be less than 15 to 1.

By injecting an oxidizing agent and water into the carburetor it becomes possible to obtain satisfactory operation of the engine with a carburetor setting which would otherwise be unsatisfactory because of ignition problems or engine knocking with the particular fuel being used. Use of an oxidizing agent, such as hydrogen peroxide, makes it possible to reduce fuel cost and to reduce air pollution by using a leaner mixture with an engine of a given compression ratio, a more economical fuel mixture, and/or a higher compression ratio.

For example, in accordance with one embodiment of the invention, an engine with a compression ratio from 9:1 to 10:1 has the carburetor 10 adjusted to provide a lean mixture with an air-fuel ratio from about 17:1 to about 20:1 during operation at normal load. Such an engine may be operated with low-lead gasoline having an octane rating somewhat lower than that of the more commonly used "regular" gasolines because of the antiknock properties of the water injected with the hydrogen peroxide.

In the preferred process, the amount of hydrogen peroxide injected into the engine is regulated in accordance with engine load and reduced when the fuel flow is reduced. This is conveniently accomplished by the apparatus of FIG. 1 using manifold pressure to regulate the flow of hydrogen peroxide to nozzle 20. The amount of hydrogen peroxide required depends on the air-fuel ratio, and for example, is more when that ratio is 20:1 than when the ratio is 18:1. In order to employ the maximum air-fuel ratio it is desirable to provide a very effective ignition system such as that of FIG. 3, but it will be understood that torch ignition is not essential.

The hydrogen peroxide may be supplied in various ways. Part or all of it may be manufactured on the vehicle or part may be provided by containers filled with hydrogen peroxide. For example, small tanks may be purchased from commercial manufacturers containing 20 to 80 percent hydrogen peroxide.

As shown in FIG. 1, a mixing tank 32 is provided for the hydrogen peroxide solution and the solution is maintained under pressure. The hydrogen peroxide and water may be supplied to the tank 32 from the supply tank 30 or any other source. It may be preferred to provide pure oxygen at the top of the mixing tank 32 and to maintain the tank under a high pressure so that hydrogen peroxide is formed and maintained at the required concentration. The high pressure oxygen can react with the water to form hydrogen peroxide and its presence reduces the reverse reaction so that the hydrogen peroxide has less tendency to decompose during storage in the mixing tank. If desired, means may be provided for agitating the liquid in the tank 32.

As shown, the tank 30 is removable, but it will be understood that it may have an opening at the top so that the water or a solution of water and alcohol or water and hydrogen peroxide may be poured into the tank.

The oxygen tanks 35 can be at a high pressure, such as 20 to 100 atmospheres or higher, to facilitate reaction of the oxygen with the water in tank 32 and to maintain the desired concentration of hydrogen peroxide. In the event the concentration becomes lower than desired because of inadequate pressure or for any other reason, additional hydrogen peroxide can be introduced from tank 30. If the concentration of hydrogen peroxide in tank 30 is high, a separate water tank may be provided to supply water for dilution in the mixing tank.

By providing two oxygen tanks, it is possible to replace either tank at any time without loss of oxygen or loss of pressure in tank 32.

The apparatus for providing hydrogen peroxide to the Honda-type engine of FIG. 3 may, of course, be the same as illustrated in FIG. 1. In accordance with this invention, the engine of FIG. 3 is operated in such a manner as to reduce the amount of fuel supplied to the carburetor 95 and increase the air-fuel ratio to a high value, such as 18:1 to 20:1, while periodically injecting through the nozzle 200 a hydrogen peroxide solution consisting of water and hydrogen peroxide. The solution may contain a small amount of alcohol.

The distributor 80 causes the flow of hydrogen peroxide and water to each cylinder to occur only during the intake stroke while the intake valve 90 is open and cuts off the flow when the valve is closed. The amount of hydrogen peroxide injected varies with engine load and may be generally proportional to the amount of fuel supplied to carburetor 95. It is sufficient to provide the air-fuel mixture in the combustion chamber 85 with the necessary combustion characteristics. Various means may be employed to increase or decrease the rate of flow of the hydrogen peroxide solution in accordance with the fuel flow to carburetor 95 or the position of the throttle valves 97. This can be conveniently handled by using intake manifold pressure to control the flow as disclosed in FIG. 1.

In the embodiment illustrated in FIG. 3, the hydrogen peroxide must be injected before the end of the intake stroke while the intake valve is open, but it will be understood that the hydrogen peroxide may be injected under high pressure directly into the cylinder while the intake and exhaust valves are closed using an injection pump of the type used for fuel injection. Direct injection is more complicated than port injection but may have some advantages. For example, direct injection of the hydrogen peroxide solution during the compression stroke or at the beginning of the power stroke may be advantageous.

The injection of an oxidizing fluid, such as hydrogen peroxide, into the main combustion chamber 85 makes it possible to achieve combustion of a very lean air-fuel mixture and to employ air-fuel ratios of about 20:1 because the additional oxygen promotes rapid flame propogation.

Heretofore it was difficult to ignite a very lean air-fuel mixture, and the inert gas, nitrogen, tended to suppress combustion. One way to reduce the ratio of nitrogen to oxygen is to add pure oxygen or an oxidizing agent, such as hydrogen peroxide. The addition of additional oxygen in this manner to increase the ratio of reactive oxygen to fuel substantially (e.g., at least 5 to 10 percent) makes it possible to achieve combustion with leaner mixtures, to save fuel and to reduce air pollution by achieving more complete combustion.

The process of this invention may, for example, be applied to a standard V-8 or 6-cylinder four-stroke automobile engine having a compression ratio of around 9.5:1 and designed to operate with the usual "low-lead" or "regular" gasoline, such as manufactured by Ford, General Motors or Chrysler. The carburetor is adjusted at the main metering jet to increase the air-fuel ratio 10 to 15 percent or more to 18:1 or greater and an aqueous solution of 20 to 30 percent hydrogen peroxide is fed to the carburetor in response to intake manifold pressure (as in FIG. 1) in an amount sufficient to provide effective combustion in each cylinder so that the engine can perform satisfactorily using a common gasoline such as Shell "regular" or Sunoco 190 or a typical low-lead gasoline sold in service stations by the major oil companies.

The process may also be used on a 1976 or 1977 four-cylinder Honda engine of the general type represented by FIG. 3 having torch ignition. The main carburetor would be adjusted to increase the air-fuel ratio at least 10 percent over that for which the engine was designed and a hydrogen peroxide solution would be introduced into the air-fuel mixture from the carburetor as in the previous example in an amount sufficient to provide effective combustion in the main combustion chamber of each cylinder when common gasolines are used, such as mentioned in the previous example.

When the Honda engine is so modified, the air-fuel ratio in each auxiliary combustion chamber is usually substantially less (e.g., at least 20 percent less) than that in the main combustion chamber. However, savings in fuel can sometimes be effected by increasing the fuel-air ratio in each auxiliary combustion chamber, and oxygen can be introduced to that chamber from an oxygen tank as disclosed in FIG. 3, for example, to facilitate starting or to reduce the probability of poor ignition under difficult conditions.

While some advantages of the present invention are obtained when the hydrogen peroxide solution injected into the engine consists of only 10 percent by weight of hydrogen peroxide, up to 90 percent by weight of water, and up to 10 or 20 percent of alcohol, the hydrogen peroxide solution usually contains 20 to 40 percent or more of hydrogen peroxide.

The invention is particularly well suited for modification of an existing standard high-compression automobile engine, for example having a compression ratio from about 9:1 to about 10:1, because all that is needed is simple auxiliary equipment which can be readily mounted on the engine. Because the water injected into the engine reduces the tendency for engine knock, it becomes possible to employ lead-free gasoline or gasoline having a lower octane rating than would otherwise be required. If the water is mixed with a fuel, such as methanol or other alcohol, the water injection can also provide a lean-burn engine with more power while it is accelerating or under high load conditions.

When modifying an existing standard engine, it is contemplated that the carburetor setting would be changed to increase the air fuel ratio substantially (e.g., 10 to 20 percent or more) and that the amount of hydrogen peroxide solution introduced into the engine would be sufficient to promote effectively the combustion of the lean mixture. For example, under high load the flow of the hydrogen peroxide solution to the engine could be 5 to 10 percent or more of the gasoline flow. The engine may, for example, require 1 to 2 gallons or more of the hydrogen peroxide solution for each 10 to 20 gallons of gasoline depending on the hydrogen peroxide concentration and other factors.

The process of this invention is versatile and makes it possible to regulate a lean-burn engine with simple or computerized controls so that it can operate satisfactorily under many different conditions. For example, the amount of water and/or alcohol and the amount and concentration of the hydrogen peroxide or other oxidizing fluid may be varied according to the conditions to obtain optimum performance. The auxiliary equipment may also be used for special purposes, such as supplying oxygen or hydrogen peroxide for starting or heating a cold engine, for providing temporary power increases, or for removing carbon deposits.

The present invention also contemplates various alternate procedures, such as introduction of the oxidizing fluid or oxidizing agent with the gasoline or other fuel entering the engine or the carburetor. In an engine wherein the fuel is injected directly into each cylinder, the hydrogen peroxide or other oxidizing fluid can be injected with or mixed with such fuel. If fuel is injected into a small auxiliary combustion chamber of each cylinder as disclosed, for example, in U.S. Pat. No. 4,038,952, an optional procedure is to introduce hydrogen peroxide into each auxiliary combustion chamber with the fuel to promote ignition during starting or during normal operation and/or to permit increase in the air-fuel ratio in the auxiliary combustion chamber or in the main combustion chamber.

The invention may be applied to various types of lean-burn engines including those having recirculation of engine exhaust as in U.S. Pat. No. 4,041,916 or other special features, such as disclosed in U.S. Pat. Nos. 4,023,543; 4,040,393 or 4,041,923. The lean-burn engines may employ various means to promote ignition other than auxiliary combustion chambers, for example as disclosed in U.S. Pat. No. 4,041,922.

As used herein, the term "oxidizing fluid" or "oxidizing agent" excludes air or a gas containing major amounts of nitrogen.

The term air-fuel ratio means the ratio of the rate of flow by weight of air to the rate of flow of fuel and as used herein excludes oxygen provided to the cylinder from the hydrogen peroxide solution.

It will be understood that all percentages given herein are by weight unless the context shows otherwise.

It will be understood that, in accordance with the patent laws, variations and modifications of the specific methods and devices disclosed herein may be made without departing from the spirit of the invention.

Having described my invention, I claim:

1. A process of operating a four-stroke high-compression reciprocating-piston internal combustion engine having a series of cylinders, means for supplying ambient air from outside the engine to said cylinders, means for supplying fuel to said engine to maintain the air-fuel ratio within a predetermined range, intake and exhaust valves for controlling the flow of gases to and from each cylinder, and means for igniting the air-fuel mixture in the main combustion chamber for each cylinder, said engine having a compression ratio of at least 9:1 and being designed for normal operation with low-lead gasoline with the air-fuel ratio below 17 to 1, said process being characterized by the steps of
  (a) modifying the flow of air and gasoline to the engine to increase the air-fuel ratio in the main combustion chamber of each cylinder at least 10 percent to at least 18 to 1 and high enough to create ignition problems when the engine is under high load,
  (b) introducing into each cylinder while the engine is under high load a solution of hydrogen peroxide to cause it to mix with the air-fuel mixture in the main combustion chamber, and
  (c) regulating the flow of hydrogen peroxide to the engine cylinders in accordance with intake manifold pressure and engine load, the weight rate of flow of said hydrogen peroxide being at least 5 percent of that of the fuel and sufficient to promote effective combustion in the main combustion chamber of each cylinder during high-load operation.

2. The process of claim 1 wherein said solution contains at least 20 percent by weight of hydrogen peroxide and the rate of feed of said solution to each cylinder by volume is at least 10 percent of that of said fuel when the engine is under heavy load.

3. The process of claim 1 wherein each cylinder has a small auxiliary combustion chamber containing ignition means and a combustible mixture is supplied to said combustion chamber having an air-fuel ratio at least 20 percent less than that of the air-fuel mixture supplied to the main chamber.

4. The process of claim 1 wherein hydrogen peroxide and additional fuel are introduced into each cylinder to provide additional power for acceleration under extreme load conditions.

5. The process of claim 1 wherein a mixture of hydrogen peroxide and water is stored under high pressure in a mixing tank and is supplied from said tank to the engine at a reduced pressure, and high purity oxygen is supplied to said mixing tank from at least one oxygen tank.

6. The process of claim 5 wherein water and oxygen are supplied to said mixing tank at a high pressure for reaction in said tank to maintain a supply of hydrogen peroxide.

7. A process of operating a four-stroke high-compression reciprocating-piston internal combustion engine having a series of cylinders, means for supplying ambient air from outside the engine to said cylinders, means for supplying fuel to said engine to maintain an air-fuel ratio within a predetermined range, intake and exhaust valves for controlling the flow of gases to and from each cylinder, and torch means for igniting the air-fuel mixture in the main combustion chamber for each cylinder including a small auxiliary combustion chamber, a combustible mixture being supplied to the auxiliary chamber of each cylinder having an air-fuel ratio at least 20 percent less than that of the air-fuel mixture supplied to the main combustion chamber, said process being characterized by the steps of
  (a) modifying the flow of air and fuel to the engine to increase the air-fuel ratio in the main combustion chamber of each cylinder at least 10 percent to at least 20:1, whereby the engine tends to malfunction under high load,
  (b) introducing into each cylinder while the engine is under high load a solution of hydrogen peroxide and water to cause it to mix with the lean air-fuel mixture in the main combustion chamber, and
  (c) regulating the flow of the hydrogen peroxide solution to the engine cylinders in accordance with engine load, the weight rate of flow of said hydrogen peroxide solution being at least 10 percent of that of the fuel.

8. The process of claim 7 wherein an additional fuel, such as alcohol, is mixed with the water and hydrogen peroxide to provide additional power under high load conditions.

9. The process of claim 7 wherein an auxiliary oxidizing fluid is introduced into the auxiliary combustion chamber to facilitate operation of the engine under adverse conditions.

10. The process of claim 7 wherein a carburetor is provided for supplying the air-fuel mixture to the main combustion chamber of each cylinder and hydrogen peroxide is supplied to the air-fuel mixture flowing from the carburetor to the cylinders.

11. The process of claim 10 wherein a mixture of hydrogen peroxide and fuel is supplied to the carburetor.

12. The process of claim 10 wherein a separate carburetor is provided for supplying a rich mixture to the auxiliary combustion chamber of each cylinder and oxygen is supplied to the auxiliary combustion chamber from an oxygen tank.

* * * * *